United States Patent
Bahramiabarghouei et al.

(10) Patent No.: US 12,237,894 B2
(45) Date of Patent: Feb. 25, 2025

(54) INDOOR CEILING RADIO UNIT FOR DISTRIBUTED ANTENNA SYSTEMS

(71) Applicant: Telefonaktiebolaget LM Ericsson (publ), Stockholm (SE)

(72) Inventors: Hadi Bahramiabarghouei, Kanata (CA); Dongxun Jia, Ottawa (CA); Xiaochuan Li, Ottawa (CA); Izabela Kurek, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 204 days.

(21) Appl. No.: 17/777,892

(22) PCT Filed: Nov. 19, 2020

(86) PCT No.: PCT/IB2020/060934
§ 371 (c)(1),
(2) Date: May 18, 2022

(87) PCT Pub. No.: WO2021/099995
PCT Pub. Date: May 27, 2021

(65) Prior Publication Data
US 2023/0018602 A1 Jan. 19, 2023

Related U.S. Application Data

(60) Provisional application No. 62/938,710, filed on Nov. 21, 2019.

(51) Int. Cl.
*H04B 7/06* (2006.01)
(52) U.S. Cl.
CPC ................... *H04B 7/0617* (2013.01)

(58) Field of Classification Search
CPC ............................... H04B 7/0617; Y02D 30/70
USPC ........................................................ 375/267
See application file for complete search history.

(56) References Cited

U.S. PATENT DOCUMENTS

2009/0061921 A1 3/2009 Eom et al.
2022/0338017 A1* 10/2022 Cimpu .................. H04W 16/10

OTHER PUBLICATIONS

International Search Report and Written Opinion dated Jan. 26, 2021 issued in PCT Application No. PCT/IB2020/060934, consisting of 15 pages.
International Telecommunication Union ITU-R, Radio Communication Sector of ITU; Recommendation ITU-R P.1238-9 (Jun. 2017); Propagation Data and Prediction Methods for the Planning of Indoor Radiocommunication Systems and Radio Local Area Networks in the Frequency Range 300 MHz to 100 GHZ; P Series, Radiowave Propagation, consisting of 28 pages.
(Continued)

*Primary Examiner* — Fitwi Y Hailegiorgis
(74) *Attorney, Agent, or Firm* — Weisberg I.P. Law, P.A.

(57) ABSTRACT

A method, system and apparatus for an optimized radiation pattern for an indoor ceiling and/or wall mounted radio unit for distributed antenna systems/radio dot systems (DAS/RDS) are disclosed. According to one aspect, a method includes obtaining beam forming weights for generating a shaped radiation pattern that provides a same effective isotropic power radiated (EIPR) at multiple locations inside a target cell, and applying the obtained beam forming weights to signals directed to an array of antenna elements of the radio interface to generate the shaped radiation pattern.

20 Claims, 10 Drawing Sheets

(56) References Cited

OTHER PUBLICATIONS

Ramakrishnaiah et al., Virtual Terrain Nullification Using Phased Array Antennas for Wireless Ad Hoc Networks; IEEE 43rd Conference on Local Computer Networks (LCN), Oct. 1, 2018, consisting of 4 pages.

\* cited by examiner

INDOOR CEILING RADIO UNIT FOR DISTRIBUTED ANTENNA SYSTEMS

FIELD

The present disclosure relates to wireless communications, and in particular, to a radiation pattern for an indoor radio unit for distributed antenna systems/radio dot systems (DAS/RDS).

BACKGROUND

With evolving wireless networks such as a Fifth Generation (5G) network designed according to standards developed by the Third Generation Partnership Project (3GPP), the radio units (RU) with higher frequency such as millimeter (mm)-Waves are required to be able to support higher modulation bandwidth as compared to earlier arrangements. Currently, there is no adequate solution for an antenna and radio frequency (RF) front-end of a mm-Wave access point for indoor applications. Phased array antennas have been proposed for outdoor use. However, for distributed solutions used for indoors, such as a distributed antenna system (DAS) or a radio dot system (RDS), phased array arrangements have several drawbacks.

One drawback is that since several remote radio heads in several locations are combined to one common path to provide one instantaneous bandwidth supported by a baseband modem, each antenna head points in a different direction when communicating with a wireless device (WD). As a result, the signal to noise ratio (SNR) in overlapping cell areas are degraded compared with sub-6 GHz products using a fixed radiation pattern antenna. The reason is that with a fixed pattern, the WD signals are received by a few antennas, while this is not the case for the phased array antennas. Secondly, since a phased array antenna is inherently directional, the antenna units used for a mm-Wave phased array system require searching and tracking states to find and service the WDs in the covered cell. This adds complexity to the modem and increases latency of the radio system.

SUMMARY

Some embodiments advantageously provide methods and arrangements for an antenna and for beamforming a radiation pattern for an indoor radio unit that can be mounted on a wall or ceiling in a distributed antenna systems/radio dot system (DAS/RDS). To solve the problems for distributed solutions and for ceiling and wall installations, the fixed radiation antenna pattern can be used for high frequencies such as mm-Wave frequencies.

The arrangements described herein provide a beam shaped radiation pattern which provides the same effective isotropic power radiated (EIPR) across any location inside the target cell as shown in FIG. 1. In this way, the concentration of higher gain is placed in locations which have more path loss.

FIG. 2 shows an antenna radiation pattern of a patch antenna which is mostly used in the current sub-6 GHz DAS/RDS systems and the proposed radiation pattern. As depicted, in the proposed radiation pattern, the maximum gain is pushed toward the edges to offset the higher pathloss existing in the edge of the cell.

By using this pattern, the coverage of the network node radio may be increased, while the radio is using a fixed pattern and the radiation direction of the radio head is always fixed. Consequently, signal to noise ratio (SNR) improvement over other solutions results from grouping of the distributed antennas utilized in distributed radio systems such as DAS and RDS systems while upgrading to the mm-Wave frequency band. Additionally, the mm-Wave system described herein avoids the searching and tracking states of beam steering, and additional latency is thereby avoided.

According to one aspect, a network node is configured to communicate with a wireless device, WD. The network node includes processing circuitry configured to obtain beam forming weights for generating a shaped radiation pattern providing a same effective isotropic power radiated, EIPR, at multiple locations inside a target cell. The processing circuitry is further configured to apply the obtained beam forming weights to signals directed to an array of antenna elements of the radio interface to generate the shaped radiation pattern.

According to this aspect, in some embodiments, the beam forming weights are obtained by using a pattern synthesis technique that operates to iteratively reduce a difference between a target radiation pattern and a resulting radiation pattern. In some embodiments, the beam forming weights are determined based at least in part on a pathloss between the network node and the wireless device. In some embodiments, the pathloss is determined according to:

$$L_{total} = 20 \log_{10} f + N \log_{10} d - 28 \text{ dB}$$

where d is a separation distance between the network node and a wireless device, f is a frequency and N is a distance power loss coefficient. In some embodiments, the shaped radiation pattern is symmetric about an axis and has increasing gain as distance from the axis increases.

According to another aspect, a method implemented in a network node includes obtaining beam forming weights for generating a shaped radiation pattern that provides a same effective isotropic power radiated (EIPR) at multiple locations inside a target cell; and applying the obtained beam forming weights to signals directed to an array of antenna elements of the radio interface to generate the shaped radiation pattern.

According to this aspect, in some embodiments, the beam forming weights are obtained by using a pattern synthesis technique that operates to iteratively reduce a difference between a target radiation pattern and a resulting radiation pattern. In some embodiments, the beam forming weights are determined based at least in part on a pathloss between the network node and the wireless device. In some embodiments, the pathloss is determined according to:

$$L_{total} = 20 \log_{10} f + N \log_{10} d - 28 \text{ dB}$$

where d is a separation distance between the network node and a wireless device, f is a frequency and N is a distance power loss coefficient. In some embodiments, the shaped radiation pattern is symmetric about an axis and has increasing gain as distance from the axis increases.

According to yet another aspect, a computer configured to determine an antenna design is provided. The computer includes processing circuitry configured to specify a target radiation pattern that provides a same effective isotropic power radiated (EIPR) at multiple locations inside a target cell, and minimize a cost function of a difference between the target radiation pattern and a radiation pattern resulting from a proposed design.

According to this aspect, in some embodiments, the cost function is based at least in part on excitations of elements of the antenna. In some embodiments, the cost function is based at least in part on distance and/or sizes of elements of the antenna. In some embodiments, the cost function is based at least in part on a pathloss determination. In some embodiments, the pathloss determination is given by:

$$L_{total}=20 \log_{10}f+N \log_{10}d-28 \text{ dB}$$

where d is a separation distance between a network node and a wireless device, f is a frequency and N is a distance power loss coefficient.

According to another aspect, a method of designing an antenna is provided. The method includes specifying a target radiation pattern that provides a same effective isotropic power radiated (EIPR) at multiple locations inside a target cell and minimizing a cost function of a difference between the target radiation pattern and a radiation pattern resulting from a proposed design.

According to this aspect, in some embodiments, the cost function is based at least in part on excitations of elements of the antenna. In some embodiments, the cost function is based at least in part on distance and/or sizes of elements of the antenna. In some embodiments, the cost function is based at least in part on a pathloss determination. In some embodiments, the pathloss determination is given by:

$$L_{total}=20 \log_{10}f+N \log_{10}d-28 \text{ dB}$$

where d is a separation distance between a network node and a wireless device, f is a frequency and N is a distance power loss coefficient.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
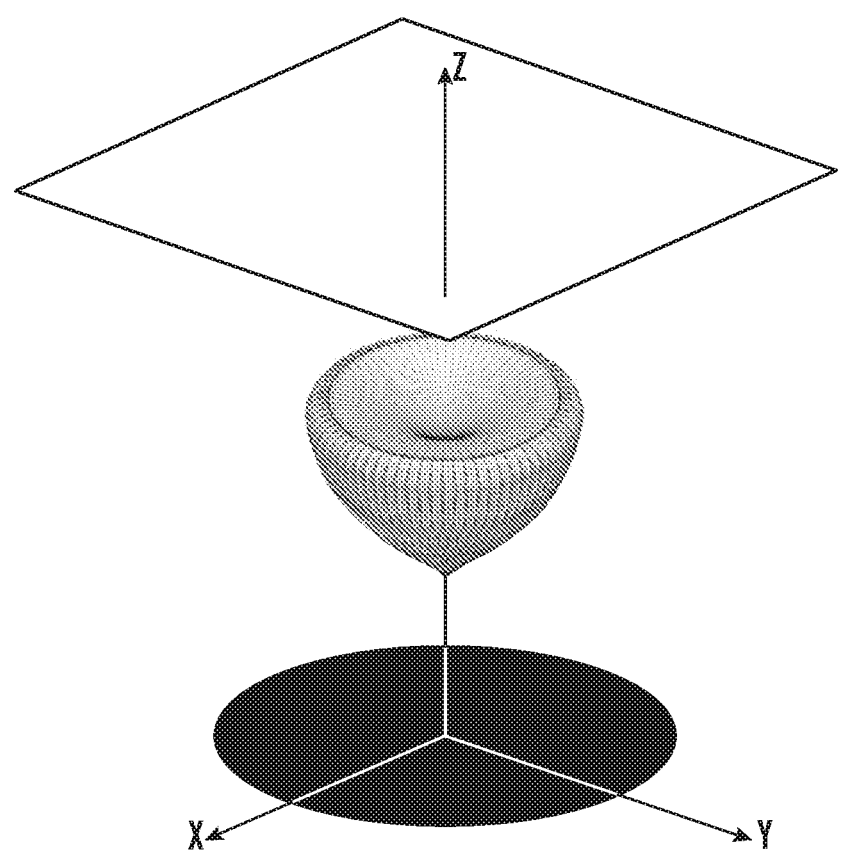
FIG. 1 illustrates a beam shaped radiation pattern which provides the same effective isotropic power radiated (EIPR) at any location inside the target cell.
Figure 2:
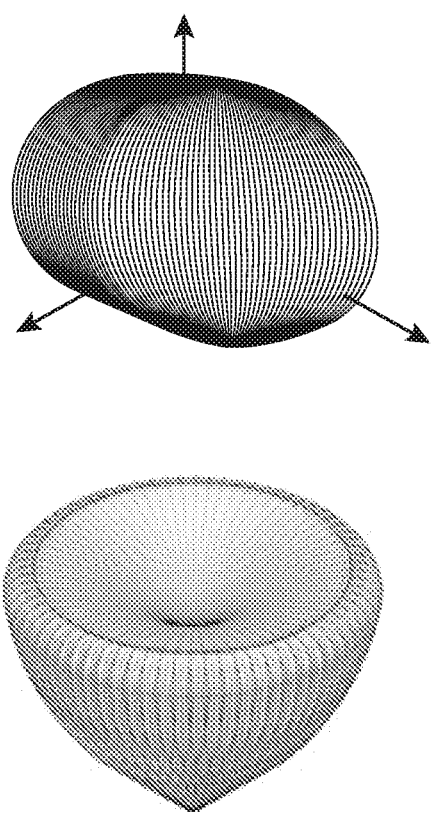
FIG. 2 illustrates an antenna radiation pattern of a patch antenna which is mostly used in the current sub-6 GHz DAS/RDS systems (top pattern) and a proposed radiation pattern (bottom pattern)

Before describing in detail exemplary embodiments, it is noted that the embodiments reside primarily in combinations of apparatus components and processing steps related to an optimized radiation pattern for an indoor ceiling and/or wall mounted radio unit having an optimized radiation pattern for distributed antenna systems/radio dot systems (DAS/RDS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Because of the existing output power limitations of a power amplifier at a mm-Wave frequency or higher frequencies, the omni-directional or directional single antenna radiation pattern such as patch antenna faces constraints. These constraints can be alleviated by employing an array of antennas in order to achieve the desired antenna radiation pattern. However, such array should provide enough power across locations inside the area serviced by a cell to be able to provide enough power to exceed the receiver sensitivity of a wireless device (WD). Also, this achieved gain can be helpful to sensitivity of a receiver of an access point for the uplink.

Figure 3:
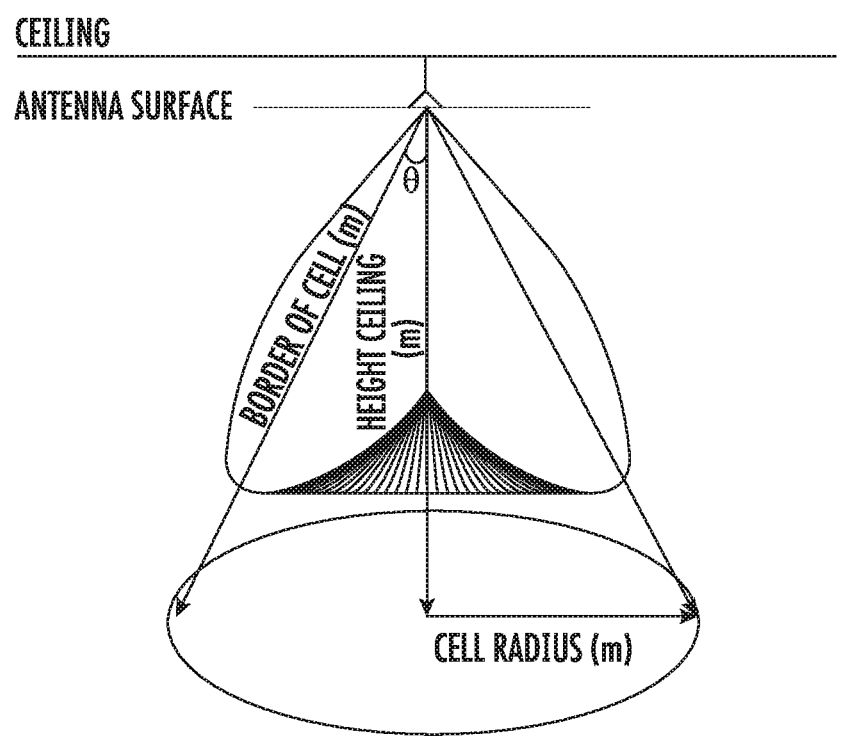
FIG. 3 illustrates the radiated power inside a target cell being shaped to provide almost the same EIPR in every location inside the cell.

Thus, embodiments provide a radiation pattern for an indoor ceiling and/or wall mounted radio unit for distributed antenna systems/radio dot systems (DAS/RDS). The solution described herein may be realized by arranging, i.e., optimizing, the radiated power of the antenna in such a way that it minimizes the radiated power in angles ($\Theta$) which are outside the target cell. The radiated power inside the targeted cell may be shaped, for example as shown in FIG. 3, to provide almost the same EIPR in every location inside the cell. In some embodiments, this results in an antenna pattern (radiation pattern) that increases in gain as distance from an axis of symmetry of the pattern increases.

Figure 4:
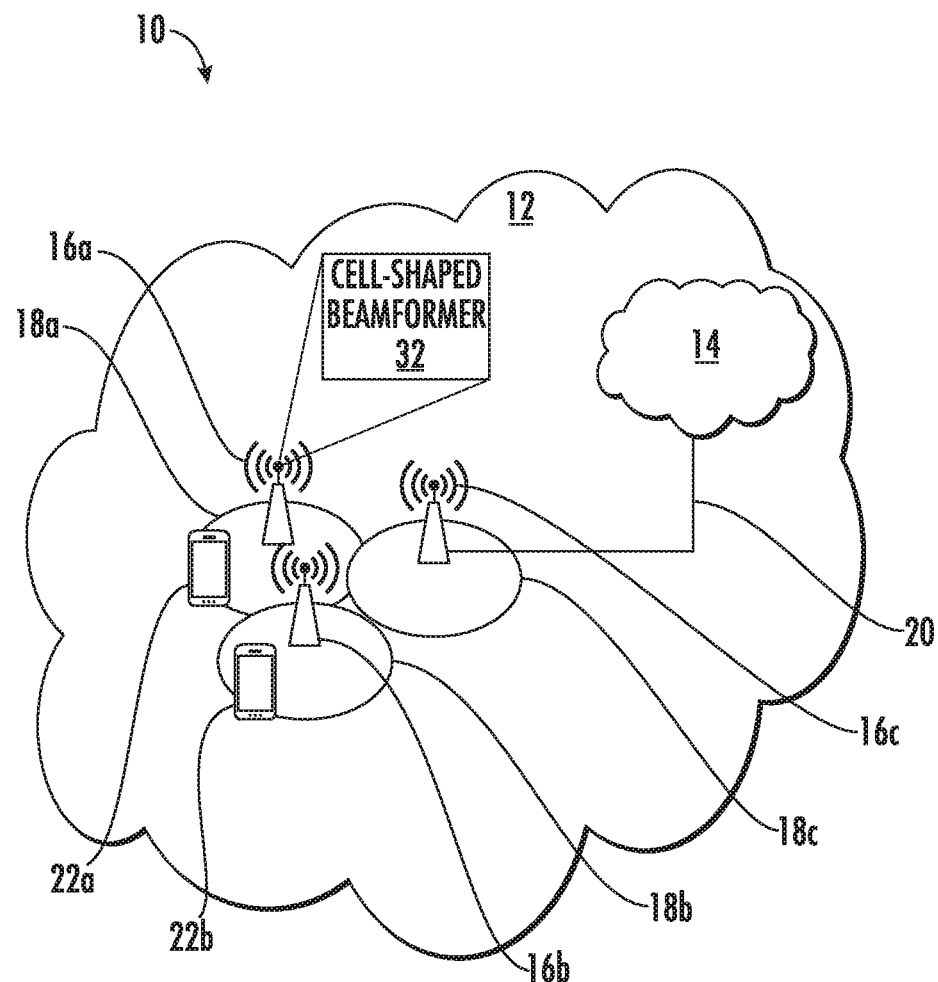
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area corresponding to a cell 18a, 18b, 18c (referred to collectively as cells 18) The cells 18 may also be referred to herein as coverage areas. One or more cells may be indoors. Each network node 16a, 16b, 16c is connectable to the core network 14 over a wired or wireless connection 20. A first wireless device (WD) 22a located in cell 18a is configured to wirelessly connect to, or be paged by, the corresponding network node 16a. A second WD 22b in cell 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include a cell-shaped beamformer 32 which is configured to apply beam forming weights to signals directed to an array 80 of antenna elements of the radio interface to generate the shaped radiation pattern, where the shaped radiation pattern provides a same effective isotropic power radiated (EIPR) at multiple locations inside a target cell. In some embodiments, the cell-shaped beamformer 32 may be configured to minimize a cost function of the difference between the target radiation pattern and a radiation pattern resulting from a proposed design.

Example implementations, in accordance with an embodiment, of the WD 22, network node 16 and host computer 24 discussed in the preceding paragraphs will now be described with reference to FIG. 5.

The communication system 10 includes a network node 16 provided in a communication system 10 and including hardware 38 which may be or include a computer, the hardware 38 enabling the network node 16 to communicate with the WD 22. The hardware 38 may include a radio interface 42 for setting up and maintaining at least a wireless connection 74 with a WD 22 located in a cell 18 served by the network node 16. The radio interface 42 may be formed as or may include, for example, one or more RF transmitters, one or more RF receivers, and/or one or more RF transceivers. The radio interface 42 includes an antenna 43, which may include an array 80 of antenna elements or may be a single antenna element or antenna, to radiate and receive signal-carrying electromagnetic waves.

In the embodiment shown, the hardware 38 of the network node 16 further includes processing circuitry 46. The processing circuitry 46 may include a processor 48 and a memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) the memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 50, or stored in external memory (e.g., database, storage array, network storage device, etc.) accessible by the network node 16 via an external connection. The software 44 may be executable by the processing circuitry 46. The processing circuitry 46 may be configured to control any of the methods and/or processes described herein and/or to cause such methods, and/or processes to be performed, e.g., by network node 16. Processor 48 corresponds to one or more processors 48 for performing network node 16 functions described herein. The memory 50 is configured to store data, programmatic software code and/or other information described herein. In some embodiments, the software 44 may include instructions that, when executed by the processor 48 and/or processing circuitry 46, causes the processor 48 and/or processing circuitry 46 to perform the processes described herein with respect to network node 16. For example, processing circuitry 46 of the network node 16 may include cell-shaped beamformer 32 which is configured to apply beam forming weights to signals directed to an array 80 of antenna elements of the radio interface to generate the shaped radiation pattern, where the shaped radiation pattern provides a same effective isotropic power radiated (EIPR) at multiple locations inside a target cell. In some embodiments, the cell-shaped beamformer 32 may be configured to minimize a cost function of the difference between the target radiation pattern and a radiation pattern resulting from a proposed design.

The communication system 10 further includes the WD 22 already referred to. The WD 22 may have hardware 60 that may include a radio interface 62 configured to set up and maintain a wireless connection 74 with a network node 16 serving a cell 18 in which the WD 22 is currently located. The radio interface 62 may be formed as or may include, for example, one or more RF transmitters, one or more RF receivers, and/or one or more RF transceivers. The radio interface 62 includes an array of antennas 63 to radiate and receive signal-carrying electromagnetic waves.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 5:
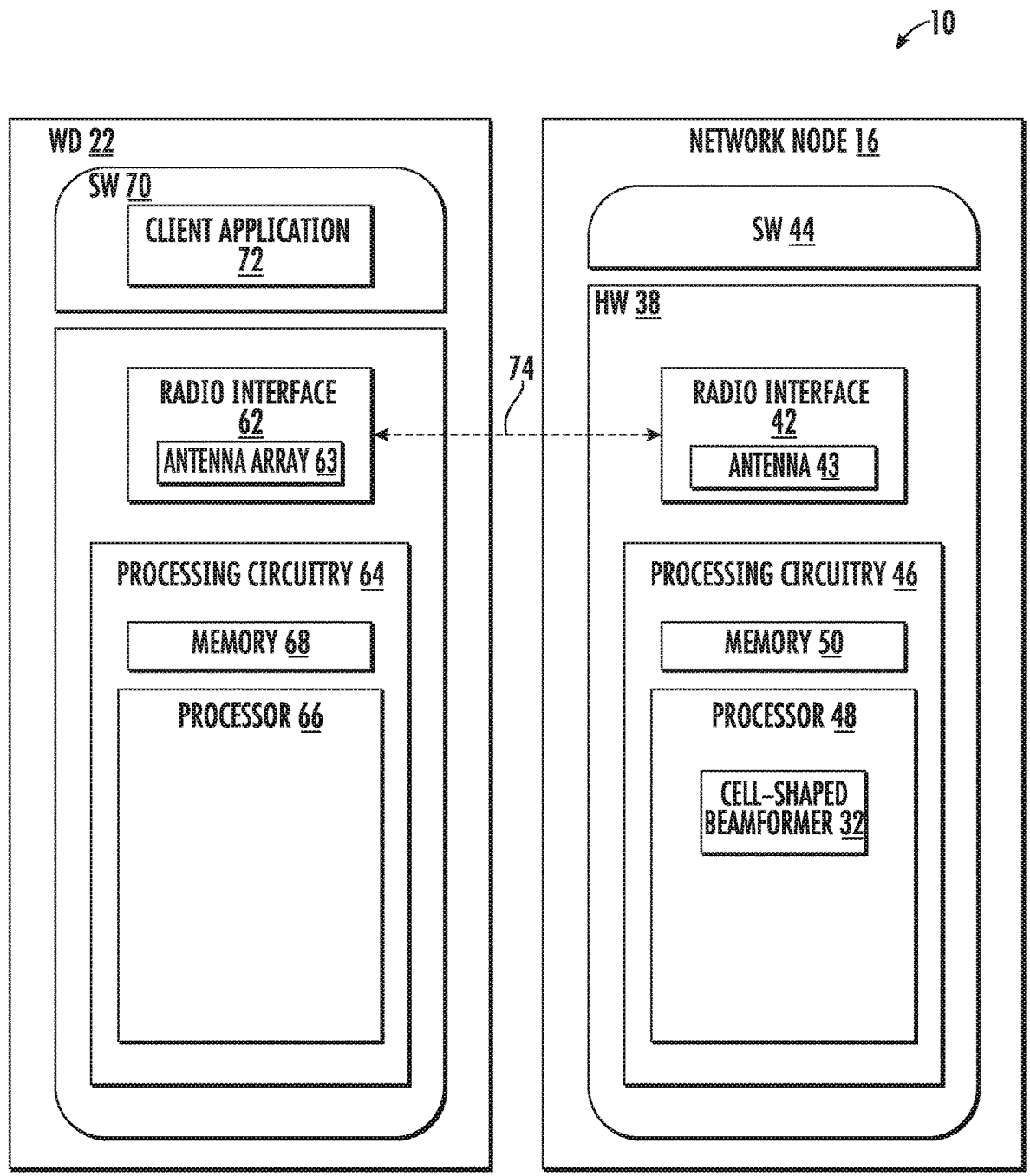
FIG. 5 is a block diagram of a network node in communication with a wireless device over an at least partially wireless connection according to some embodiments of the present disclosure.

In some embodiments, the inner workings of the network node 16 and WD 22 may be as shown in FIG. 5 and independently, the surrounding network topology may be that of FIG. 4.

The wireless connection 74 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 4 and 5 show various "units" such as cell-shaped beamformer 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
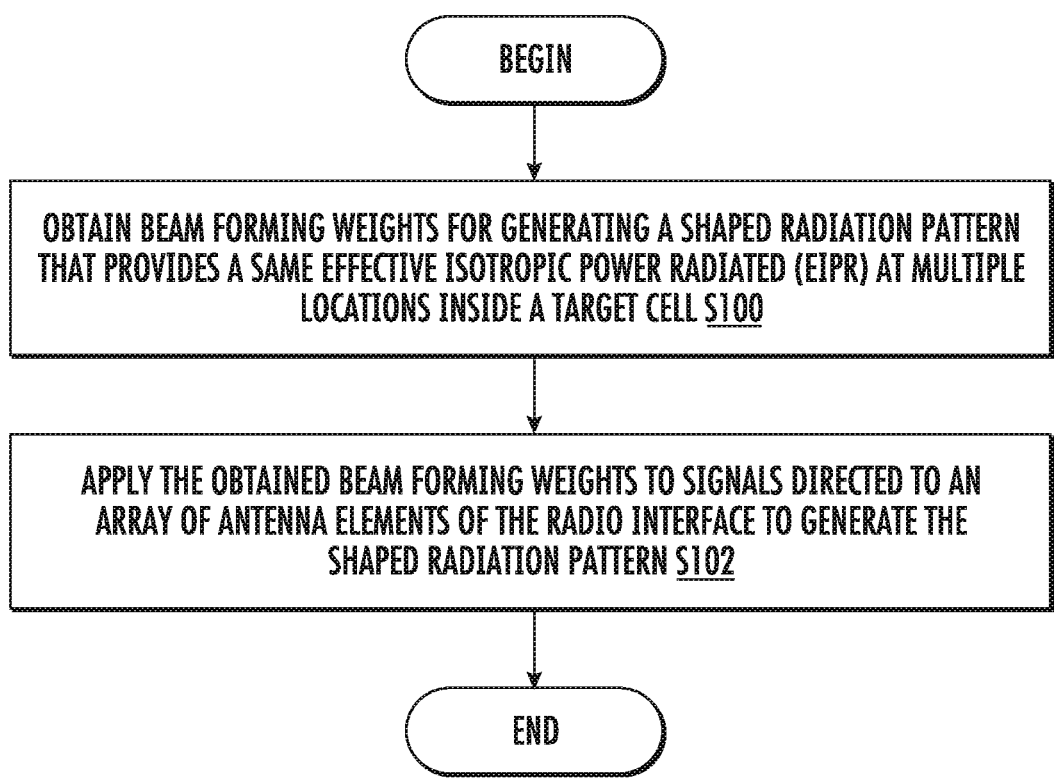
FIG. 6 is a flowchart of an exemplary process in a network node for generating an optimized radiation pattern for an indoor radio unit, such as for wall and/or ceiling mounting, for distributed antenna systems/radio dot systems (DAS/RDS)

FIG. 6 is a flowchart of an exemplary process in a network node 16 for a radiation pattern for an indoor ceiling and/or wall mounted radio unit for distributed antenna systems/radio dot systems (DAS/RDS) that is optimized as compared with other solutions. One or more blocks described herein may be performed by one or more elements of network node 16 such as by one or more of processing circuitry 46 (including the cell-shaped beamformer 32), processor 48 and/or radio interface 42. Network node 16 such as via processing circuitry 46 and/or processor 48 and/or radio interface 42 is configured to obtain beam forming weights for generating a shaped radiation pattern that provides a same effective isotropic power radiated (EIPR) at multiple locations inside a target cell (Block S100). The process also includes applying the obtained beam forming weights to signals directed to an array of antenna elements of the radio interface to generate the shaped radiation pattern (Block S102).

where d is a separation distance (m) between the network node 16 and a wireless device 22, f is a frequency (MHz) and N is a distance power loss coefficient. In some models, the pathloss may increase with distance from a central axis.

Table 1 shows examples of the N coefficient for different frequency ranges from line of sight and non-line of sight in which the superscript "(12)" designates cell contents where the upper number is for Line of Sight (LoS) cases and the lower number is for Non-LoS cases.

TABLE 1

| Frequency (GHz) | Residential | Office | Commercial | Factory | Corridor | Data Centre |
|---|---|---|---|---|---|---|
| 5.8 | — | 24 | — | — | — | — |
| 26 | — | $19.5^{(14)}$ | — | — | — | — |
| 28 | — | $18.4^{(12)}$ | $27.6^{(8)}$ | — | — | — |
|  | — | $29.9^{(12)}$ | $17.9^{(12, 13)}$ | — | — | — |
|  |  |  | $24.8^{(12, 13)}$ |  |  |  |
| 37 | — | $15.6^{(14)}$ | — | — | — | — |
| 38 | — | $20.3^{(12)}$ | $18.6^{(12, 13)}$ | — | — | — |
|  | — | $29.6^{(12)}$ | $25.9^{(12, 13)}$ | — | — | — |
| 51-57 | — | $15^{(10)}$ | — | — | $13^{(10)}$ | — |
|  |  |  |  |  | $16.3^{(7, 10)}$ |  |
| 60 | — | $22^{(1)}$ | $17^{(1)}$ | — | $16^{(1)(7)(9)}$ | — |
| 67-73 | — | $19^{(11)}$ | — | — | $16^{(11)}$ | — |
|  |  |  |  |  | $17.6^{(7, 11)}$ |  |
| 70 | — | $22^{(1)}$ | — | — | — | — |
| 300 | — | $20^{(15)}$ | — | — | $19.5^{(9, 15)}$ | $20.2^{(15)}$ |

Figure 7:
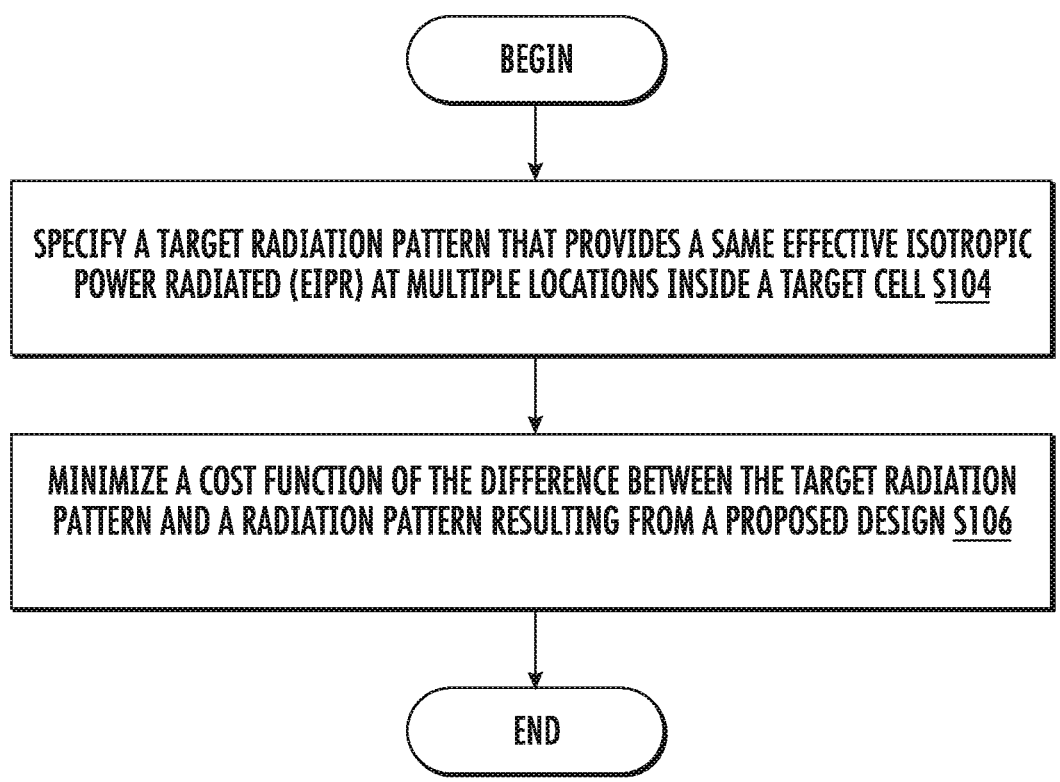
FIG. 7 is a flowchart of an exemplary process for designing an antenna having effective isotropic power radiated (EIPR) at multiple locations inside a target cell.

FIG. 7 is a flowchart of an exemplary process for designing an antenna according to principles set forth herein. The process may be performed by processing circuitry. The processing circuitry may include a processor and memory. In particular, in addition to or instead of a processor, such as a central processing unit, and memory, the processing circuitry may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor may be configured to access (e.g., write to and/or read from) memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). The process includes specifying a target radiation pattern that provides a same effective isotropic power radiated (EIPR) at multiple locations inside a target cell (Block S104) and minimizing a cost function of the difference between the target radiation pattern and a radiation pattern resulting from a proposed design (Block S106).

Having described the general process flow of arrangements of the disclosure and having provided examples of hardware and software arrangements for implementing the processes and functions of the disclosure, the sections below provide details and examples of arrangements for an optimized radiation pattern for an indoor ceiling and/or wall mounted radio unit with a radiation pattern for distributed antenna systems/radio dot systems (DAS/RDS).

Figure 8:
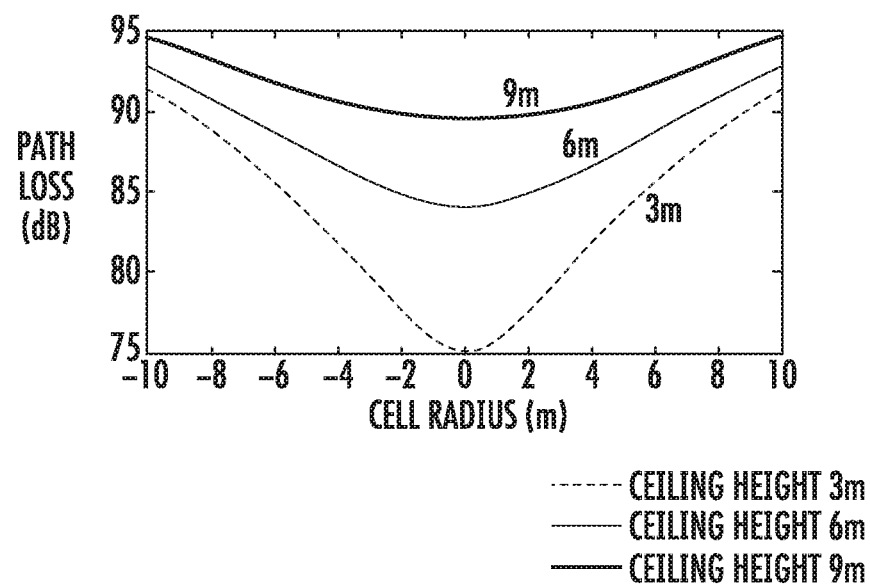
FIG. 8 is a graph of path loss versus cell radius.

A methodology for shaping strategy inside the cell 18, i.e., coverage area, may be based on pathloss between the access point and the wireless device location. The targeted cell 18 may have a circular shape and, from center to perimeter, the pathloss may be as depicted in FIG. 8. One suggested pathloss for indoors is as follows:

$$L_{total} = 20 \log_{10} f + N \log_{10} d - 28 \text{ dB}$$

As an example, the pathloss is calculated for 28 GHz and for three different ceiling heights (3, 6 and 9 meters) as shown in FIG. 8. The pathloss is plotted for a cell 18 with a 20 meter diameter when the antenna will be placed in the center of the cell 18. The parameter N is chosen for non-line of sight and office applications which may be the worst case in terms of pathloss.

Figure 9:
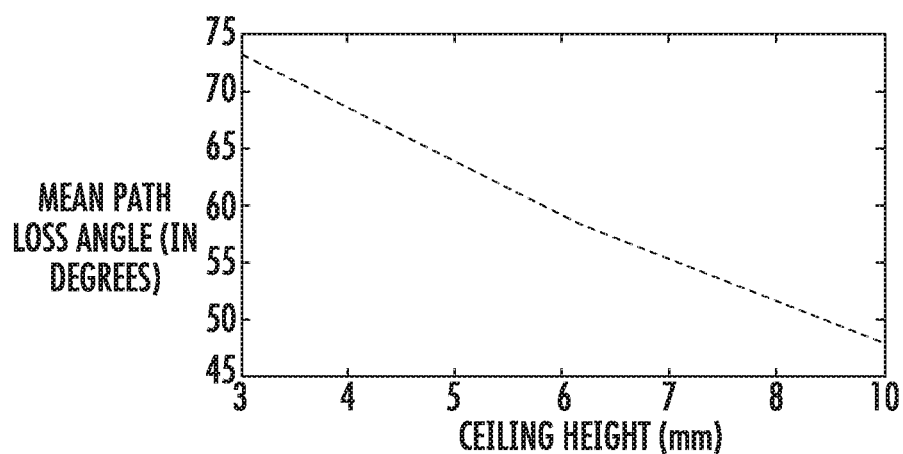
FIG. 9 is graph of mean path loss angle versus ceiling height.

As shown in FIG. 8, the pathloss increases far from the center in some embodiments. This suggests increasing the gain of the antenna array in the same way that the pathloss is increased. Therefore, the gain may be designed to offset the pathloss and uniform EIPR may be provided across the targeted cell 18. FIG. 9 shows a ⊖ range when the ceiling height is increased to cover a 20 mm cell with uniform EIPR. As observed in FIGS. 8 and 9, for low ceiling deployment, the pathloss variation and ⊖ range are increased in some examples.

In a realization stage, the curves related to FIG. 8 can be measured in the field in case modifications to be applied on the depicted curves is desired or needed.

Figure 10:
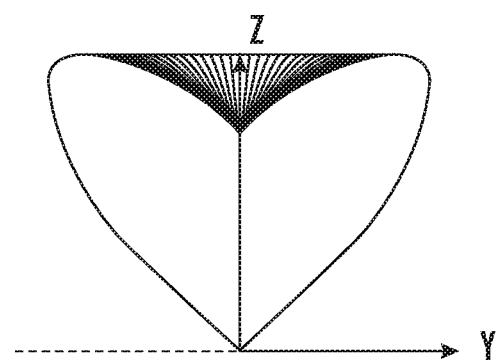
FIG. 10 illustrates cross sections of an antenna pattern having symmetry along the z-axis to be able to shape a circular cell.
Figure 10:
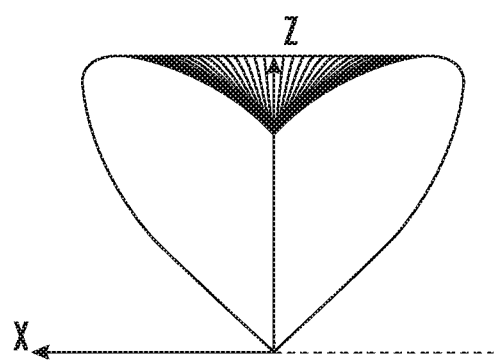
Figure 11:
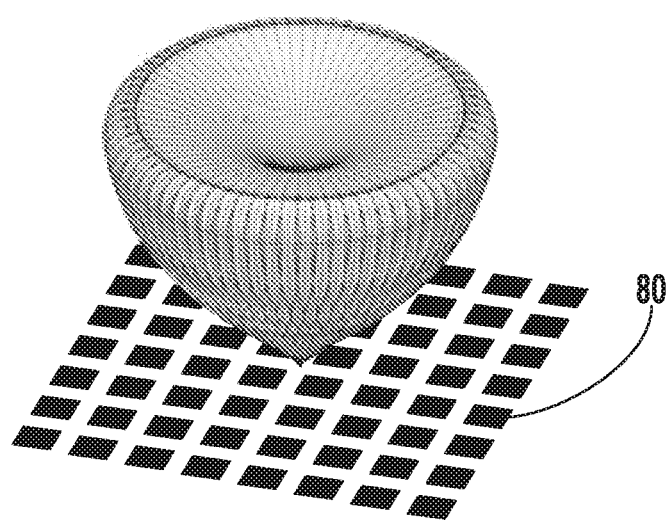
FIG. 11 is a diagram of an array of antennas for beam shaping according to principles set forth herein.

One example pattern shown in FIG. 10 has symmetry about the z-axis and is shaped to serve a circular cell. To realize such a pattern, there are several possible antenna pattern synthesis techniques that may be implemented by a processor such as processor 48 and/or beamformer 32. It will be understood that the pattern synthesis may be performed by a first processor and the resulting beamforming weights may then be transferred to the processor 48 for beam shaping, such as by beamformer 32. One arrangement shown in FIG. 11 is to use an array 80 of antenna elements to serve as the antenna 43. The antenna array 80 shown in FIG. 11 is a two dimensional array. Three dimensional arrays may be implemented. Using the array, the proposed pattern may be the target pattern for an optimization process. Then, elements for the array can be selected. The antenna elements can be identical or different. For example, the antenna elements can be of different sizes and/or different shapes. Then, a cost function may be defined as a subtraction of the target pattern from the resulting pattern that would arise from application of a proposed set of signals to selected elements of the array. The array and the cost function may have several variables such as amplitude and phase applied to each element, distance between antennas in the array, size of the elements in the array, etc. An optimization tool can be used to minimize the error of the cost function and to achieve an acceptable error range in the targeted radiation pattern.

Thus, a fixed radiation pattern is provided that is suitable for indoor ceiling and/or wall mounted applications utilized in distributed radio systems such as DAS and RDS systems. The pattern may extend the covered cell as compared to an omni-directional pattern or a conventional directional pattern such as the pattern of a conventional patch antenna. Therefore, the pattern can be useful for high frequency applications such as mm-Wave applications having power amplifier limitations.

By building on the fixed radiation pattern concept, one solution described herein offers an alternative to more complex solutions involving phased array antennas and analogue/digital beam forming and beam steering. Some solutions provide design flexibility and simplify the current modem (digital unit) for higher frequency ranges. Note that there is a difference between conventional beam forming, which involves beam steering, and the beam forming (shaping) described herein. The beam formed in some embodiments described herein is not in the form of a conventional beam that is steered, but rather, is a fixed broad energy distribution that occupies a cell according to a desired fixed target pattern. The fixed broad distribution is not omni-directional but rather, may be shaped to provide gain that counters path loss in a cell.

According to one aspect, a network node 16 is configured to communicate with a wireless device, WD 22. The network node 16 includes processing circuitry 46 configured to obtain beam forming weights for generating a shaped radiation pattern providing a same effective isotropic power radiated, EIPR, at multiple locations inside a target cell. The processing circuitry 46 is further configured to apply the obtained beam forming weights to signals directed to an array 80 of antenna elements of an antenna 43 of the radio interface 42 to generate the shaped radiation pattern.

According to this aspect, in some embodiments, the beam forming weights are obtained by using a pattern synthesis technique, implemented by the processing circuitry 46, that operates to iteratively reduce a difference between a target radiation pattern and a resulting radiation pattern. In some embodiments, the beam forming weights are determined based at least in part on a pathloss between the network node and the wireless device. In some embodiments, the pathloss is determined according to:

$$L_{total}=20\ \log_{10}f+N\ \log_{10}d-28\ \text{dB}$$

where d is a separation distance between the network node and a wireless device, f is a frequency and N is a distance power loss coefficient. In some embodiments, the shaped radiation pattern is symmetric about an axis and has increasing gain as distance from the axis increases.

According to another aspect, a method implemented in a network node 16 includes obtaining, via the processing circuitry 46, beam forming weights for generating a shaped radiation pattern that provides a same effective isotropic power radiated (EIPR) at multiple locations inside a target cell; and applying, via the radio interface 42, the obtained beam forming weights to signals directed to an array 80 of antenna elements of the radio interface 42 to generate the shaped radiation pattern.

According to this aspect, in some embodiments, the beam forming weights are obtained by using a pattern synthesis technique that operates to iteratively reduce a difference between a target radiation pattern and a resulting radiation pattern. In some embodiments, the beam forming weights are determined based at least in part on a pathloss between the network node and the wireless device. In some embodiments, the pathloss is determined according to:

$$L_{total}=20\ \log_{10}f+N\ \log_{10}d-28\ \text{dB}$$

where d is a separation distance between the network node and a wireless device, f is a frequency and N is a distance power loss coefficient. In some embodiments, the shaped radiation pattern is symmetric about an axis and has increasing gain as distance from the axis increases.

According to yet another aspect, a computer configured to determine an antenna design is provided. The hardware 38, e.g., computer, includes processing circuitry 46 configured to specify a target radiation pattern that provides a same effective isotropic power radiated (EIPR) at multiple locations inside a target cell, and minimize a cost function of a difference between the target radiation pattern and a radiation pattern resulting from a proposed design.

According to this aspect, in some embodiments, the cost function is based at least in part on excitations of elements of the antenna 43. In some embodiments, the cost function is based at least in part on distance and/or sizes of elements of the antenna 43. In some embodiments, the cost function is based at least in part on a pathloss determination. In some embodiments, the pathloss determination is given by:

$$L_{total}=20\ \log_{10}f+N\ \log_{10}d-28\ \text{dB}$$

where d is a separation distance between a network node and a wireless device, f is a frequency and N is a distance power loss coefficient.

According to another aspect, a method of designing an antenna 43 is provided. The method includes specifying a target radiation pattern that provides a same effective isotropic power radiated (EIPR) at multiple locations inside a target cell and minimizing, via the processing circuitry 46, a cost function of a difference between the target radiation pattern and a radiation pattern resulting from a proposed design.

According to this aspect, in some embodiments, the cost function is based at least in part on excitations of elements of the antenna 43. In some embodiments, the cost function is based at least in part on distance and/or sizes of elements of the antenna 43. In some embodiments, the cost function is based at least in part on a pathloss determination. In some embodiments, the pathloss determination is given by:

$$L_{total}=20\ \log_{10}f+N\ \log_{10}d-28\ \text{dB}$$

where d is a separation distance between a network node and a wireless device, f is a frequency and N is a distance power loss coefficient.

According to one aspect, a network node 16 configured to communicate with a wireless device (WD) 22, includes a radio interface 42 and/or processing circuitry 46 configured to obtain beam forming weights for generating a shaped radiation pattern that provides a same effective isotropic power radiated (EIPR) at multiple locations inside a target cell 18. The network node 16 further applies, via the cell-shaped beamformer 32, the obtained beam forming weights to signals directed to an array of antenna elements forming antenna 43 of the radio interface 42 to generate the shaped radiation pattern.

According to this aspect, in some embodiments, the beam forming weights are obtained by using a pattern synthesis technique that operates to iteratively reduce a difference between a target radiation pattern and a resulting radiation pattern. In some embodiments, the beam forming weights are determined based at least in part on a pathloss between the network node and the wireless device. In some embodiments, the pathloss is determined according to:

$$L_{total} = 20 \log_{10} f + N \log_{10} d - 28 \text{ dB}$$

where d is a separation distance between the network node 16 and a wireless device 22, f is a frequency and N is a distance power loss coefficient. In some embodiments, the shaped radiation pattern is symmetric about an axis and has increasing gain as distance from the axis increases.

According to another aspect, a method includes obtaining, via processing circuitry 46, beam forming weights for generating a shaped radiation pattern that provides a same effective isotropic power radiated (EIPR) at multiple locations inside a target cell 18. The method also includes applying, via the processing circuitry 46 and/or the radio interface 42, the obtained beam forming weights to signals directed to an array of antenna elements forming antenna 43 of the radio interface 42 to generate the shaped radiation pattern.

According to this aspect, in some embodiments, the beam forming weights are obtained by using a pattern synthesis technique implemented by the processing circuitry 46 that operates to iteratively reduce a difference between a target radiation pattern and a resulting radiation pattern. In some embodiments, the beam forming weights are determined via processing circuitry 46, based at least in part on a pathloss between the network node 16 and the wireless device 22. In some embodiments, the pathloss is determined according to:

$$L_{total} = 20 \log_{10} f + N \log_{10} d - 28 \text{ dB}$$

where d is a separation distance between the network node 16 and a wireless device 22, f is a frequency and N is a distance power loss coefficient. In some embodiments, the shaped radiation pattern is symmetric about an axis and has increasing gain as distance from the axis increases.

According to yet another aspect, a method of designing an antenna 43 includes specifying a target radiation pattern that provides a same effective isotropic power radiated (EIPR) at multiple locations inside a target cell 18, and minimizing a cost function of the difference between the target radiation pattern and a radiation pattern resulting from a proposed design.

According to this aspect, in some embodiments, the cost function is based at least in part on excitations of elements of the antenna 43. In some embodiments, the cost function is based at least in part on distance and/or sizes of elements of the antenna 43. In some embodiments, the cost function is based at least in part on a pathloss determination. In some embodiments, the pathloss determination is given by:

$$L_{total} = 20 \log_{10} f + N \log_{10} d - 28 \text{ dB}$$

where d is a separation distance between a network node 16 and a wireless device 22, f is a frequency and N is a distance power loss coefficient. In some embodiments, the target radiation pattern is symmetric about an axis and has increasing gain as distance from the axis increases.

Some embodiments include the following:

Embodiment A1. A network node configured to communicate with a wireless device (WD), the network node configured to, and/or comprising a radio interface and/or comprising processing circuitry configured to:
 obtain beam forming weights for generating a shaped radiation pattern that provides a same effective isotropic power radiated (EIPR) at multiple locations inside a target cell; and
 apply the obtained beam forming weights to signals directed to an array of antenna elements of the radio interface to generate the shaped radiation pattern.

Embodiment A2. The network node of Embodiment A1, wherein the beam forming weights are obtained by using a pattern synthesis technique that operates to iteratively reduce a difference between a target radiation pattern and a resulting radiation pattern.

Embodiment A3. The network node of any of Embodiments A1 and A2, wherein the beam forming weights are determined based at least in part on a pathloss between the network node and the wireless device.

Embodiment A4. The network node of Embodiment A3, wherein the pathloss is determined according to:

$$L_{total} = 20 \log_{10} f + N \log_{10} d - 28 \text{ dB}$$

where d is a separation distance between the network node and a wireless device, f is a frequency and N is a distance power loss coefficient.

Embodiment A5. The network node of any of Embodiments A1-A4, wherein the shaped radiation pattern is symmetric about an axis and has increasing gain as distance from the axis increases.

Embodiment B1. A method implemented in a network node, the method comprising:
 obtaining beam forming weights for generating a shaped radiation pattern that provides a same effective isotropic power radiated (EIPR) at multiple locations inside a target cell; and
 applying the obtained beam forming weights to signals directed to an array of antenna elements of the radio interface to generate the shaped radiation pattern.

Embodiment B2. The method of Embodiment B1, wherein the beam forming weights are obtained by using a pattern synthesis technique that operates to iteratively reduce a difference between a target radiation pattern and a resulting radiation pattern.

Embodiment B3. The method of any of Embodiments B1 and B2, wherein the beam forming weights are determined based at least in part on a pathloss between the network node and the wireless device.

Embodiment B4. The method of Embodiment B3, wherein the pathloss is determined according to:

$$L_{total} = 20 \log_{10} f + N \log_{10} d - 28 \text{ dB}$$

where d is a separation distance between the network node and a wireless device, f is a frequency and N is a distance power loss coefficient.

Embodiment B5. The method of any of Embodiments B1-B4, wherein the shaped radiation pattern is symmetric about an axis and has increasing gain as distance from the axis increases.

Embodiment C1. A method of designing an antenna, the method comprising:
 specifying a target radiation pattern that provides a same effective isotropic power radiated (EIPR) at multiple locations inside a target cell; and minimizing a cost function of a difference between the target radiation pattern and a radiation pattern resulting from a proposed design.

Embodiment C2. The method of Embodiment C1, wherein the cost function is based at least in part on excitations of elements of the antenna.

Embodiment C3. The method of any of Embodiments C1 and C2, wherein the cost function is based at least in part on distance and/or sizes of elements of the antenna.

Embodiment C4. The method of any of Embodiments C1-C3, wherein the cost function is based at least in part on a pathloss determination.

Embodiment C5. The method of Embodiment C4, wherein the pathloss determination is given by:

$$L_{total} = 20 \log_{10} f + N \log_{10} d - 28 \text{ dB}$$

where d is a separation distance between a network node and a wireless device, f is a frequency and N is a distance power loss coefficient.

Embodiment C6. The method of any of Embodiments C1-C5, wherein the target radiation pattern is symmetric about an axis and has increasing gain as distance from the axis increases.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| DAS | Distributed Antenna System |
| EIPR | Effective Isotropic Power Radiated |
| RDS | Radio Dot System |
| RU | Radio Unit |
| SNR | Signal to Noise Ratio |
| UE | User Equipment |
| WD | Wireless Device |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising a radio interface and processing circuitry, the processing circuitry configured to:
obtain beam forming weights for generating a shaped radiation pattern providing a same effective isotropic power radiated (EIPR) at multiple locations inside a target cell; and
apply the obtained beam forming weights to signals directed to an array of antenna elements of the radio interface to generate the shaped radiation pattern.

2. The network node of claim 1, wherein the beam forming weights are obtained by using a pattern synthesis technique that operates to iteratively reduce a difference between a target radiation pattern and a resulting radiation pattern.

3. The network node of claim 1, wherein the beam forming weights are determined based at least in part on a pathloss between the network node and the wireless device.

4. The network node of claim 3, wherein the pathloss is determined according to:

$$L_{total} = 20 \log_{10} f + N \log_{10} d - 28 \text{ dB}$$

where d is a separation distance between the network node and the wireless device, f is a frequency and N is a distance power loss coefficient.

5. The network node of claim 1, wherein the shaped radiation pattern is symmetric about an axis and has increasing gain as distance from the axis increases.

6. A method implemented in a network node configured to communicate with a wireless device, the method comprising:
obtaining beam forming weights for generating a shaped radiation pattern that provides a same effective isotropic power radiated (EIPR) at multiple locations inside a target cell; and
applying the obtained beam forming weights to signals directed to an array of antenna elements of a radio interface of the network node to generate the shaped radiation pattern.

7. The method of claim 6, wherein the beam forming weights are obtained by using a pattern synthesis technique that operates to iteratively reduce a difference between a target radiation pattern and a resulting radiation pattern.

8. The method of claim 6, wherein the beam forming weights are determined based at least in part on a pathloss between the network node and the wireless device.

9. The method of claim 8, wherein the pathloss is determined according to:

$$L_{total} = 20 \log_{10} f + N \log_{10} d - 28 \text{ dB}$$

where d is a separation distance between the network node and the wireless device, f is a frequency and N is a distance power loss coefficient.

10. The method of claim 6, wherein the shaped radiation pattern is symmetric about an axis and has increasing gain as distance from the axis increases.

11. A computer configured to determine a design of an antenna, the computer comprising processing circuitry configured to:
determine a target radiation pattern that provides a same effective isotropic power radiated (EIPR) at multiple locations inside a target cell;
iteratively select a configuration of antenna elements of a proposed antenna;
for each selected configuration:
determine a radiation pattern resulting from the selected configuration;
determine a cost function based at least in part on a difference between the target radiation pattern and the resultant radiation pattern of the selected configuration; and
determine the selected configuration that minimizes the cost function.

12. The computer of claim 11, wherein the cost function is based at least in part on excitations of elements of the antenna.

13. The computer of claim 11, wherein the cost function is based at least in part on one of distance and sizes of elements of the antenna.

14. The computer of claim 11, wherein the cost function is based at least in part on a pathloss determination.

15. The computer of claim 14, wherein the pathloss determination is given by:

$$L_{total} = 20 \log_{10} f + N \log_{10} d - 28 \text{ dB}$$

where d is a separation distance between a network node and a wireless device, f is a frequency and N is a distance power loss coefficient.

16. A method of designing an antenna, the method comprising:
determining a target radiation pattern that provides a same effective isotropic power radiated (EIPR), at multiple locations inside a target cell;
iteratively selecting a configuration of antenna elements of a proposed antenna;
for each selected configuration:
determining a radiation pattern resulting from the selected configuration;
determining a cost function based at least in part on a difference between the target radiation pattern and the resultant radiation pattern of the selected configuration; and
determine a selected configuration that minimizes the cost function.

17. The method of claim 16, wherein the cost function is based at least in part on excitations of elements of the antenna.

18. The method of claim 16, wherein the cost function is based at least in part on at least one of distance and sizes of elements of the antenna.

19. The method of claim 16, wherein the cost function is based at least in part on a pathloss determination.

20. The method of claim 19, wherein the pathloss determination is given by:

$$L_{total} = 20 \log_{10} f + N \log_{10} d - 28 \text{ dB}$$

where d is a separation distance between a network node and a wireless device, f is a frequency and N is a distance power loss coefficient.

* * * * *